(12) United States Patent
Brindise

(10) Patent No.: US 8,348,534 B1
(45) Date of Patent: Jan. 8, 2013

(54) INFANT/CHILD CRAYON GRIP SYSTEM

(76) Inventor: Susan E. Brindise, Tampa, FL (US)

( * ) Notice: Subject to any disclaimer, the term of this patent is extended or adjusted under 35 U.S.C. 154(b) by 1116 days.

(21) Appl. No.: 11/985,681

(22) Filed: Nov. 16, 2007

Related U.S. Application Data

(60) Provisional application No. 60/859,999, filed on Nov. 20, 2006.

(51) Int. Cl.
*A46B 5/02* (2006.01)

(52) U.S. Cl. .......................................................... 401/6

(58) Field of Classification Search ................. 401/6, 54, 401/88, 8
See application file for complete search history.

(56) References Cited

U.S. PATENT DOCUMENTS

| | | | | |
|---|---|---|---|---|
| 4,601,598 | A | * | 7/1986 | Schwartz et al. ................. 401/6 |
| 6,019,533 | A | * | 2/2000 | Smith ................................ 401/6 |
| 6,648,535 | B2 | * | 11/2003 | Ferrara, Jr. ....................... 401/6 |

* cited by examiner

*Primary Examiner* — Huyen Le

(57) ABSTRACT

A writing implement has a cylindrical configuration over the majority of its extent. The writing implement has a leading and trailing end and a side wall. A generally tubular gripping member has an essentially cylindrical exterior surface and a bore forming a cylindrical interior surface. The gripping member has a leading and a trailing face. The writing implement is frictionally received by and supported within the interior surface of the gripping member. The leading end of the writing implement is spaced from the leading face of the gripping member. The gripping member is fabricated of a resilient material.

11 Claims, 4 Drawing Sheets

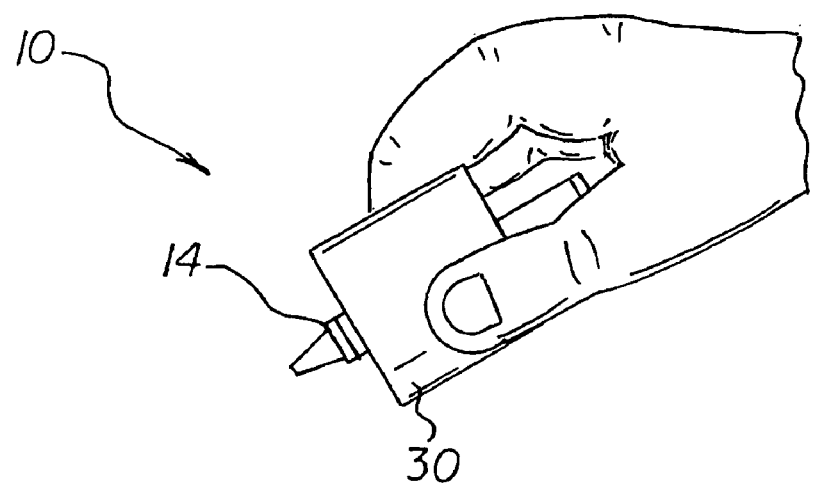
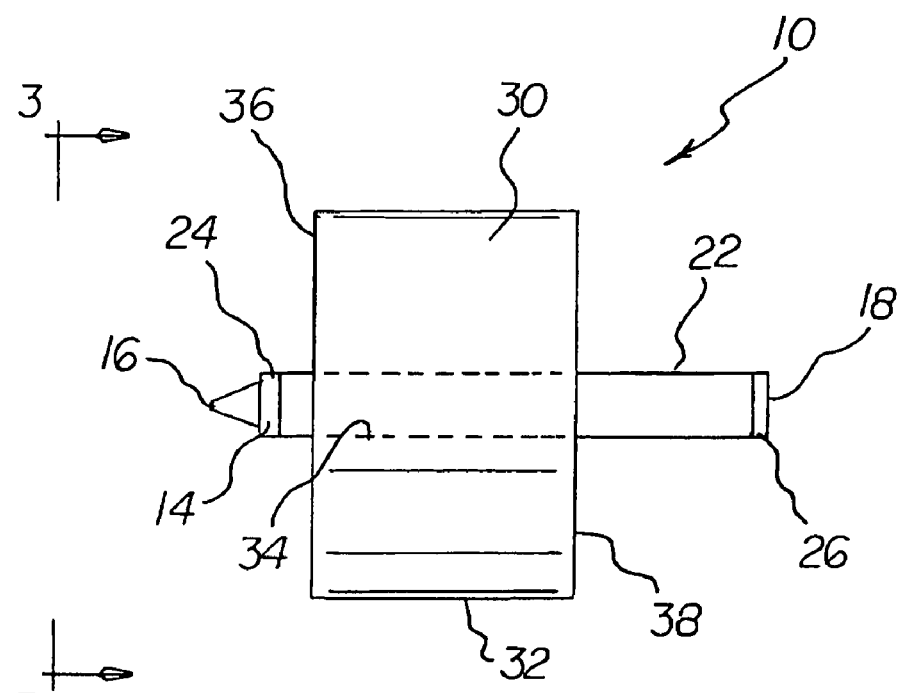

FIG 5
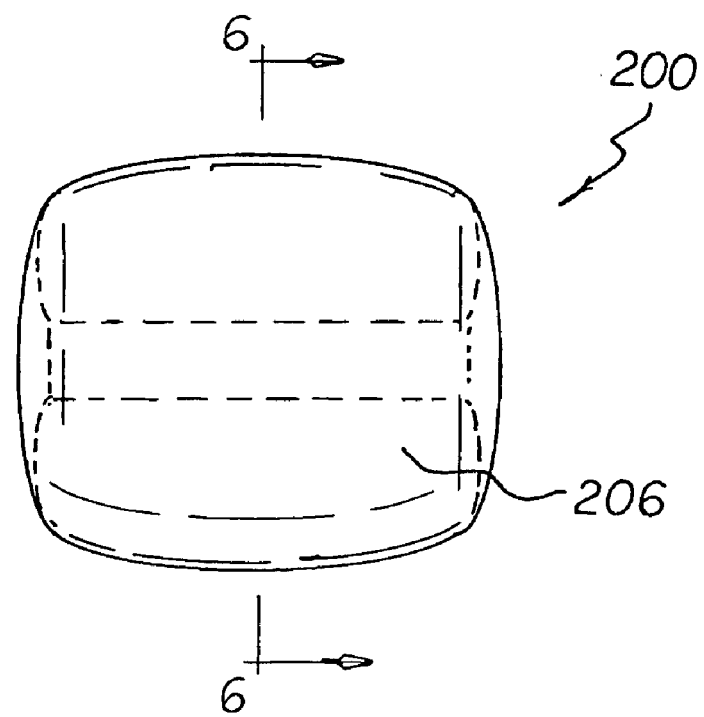
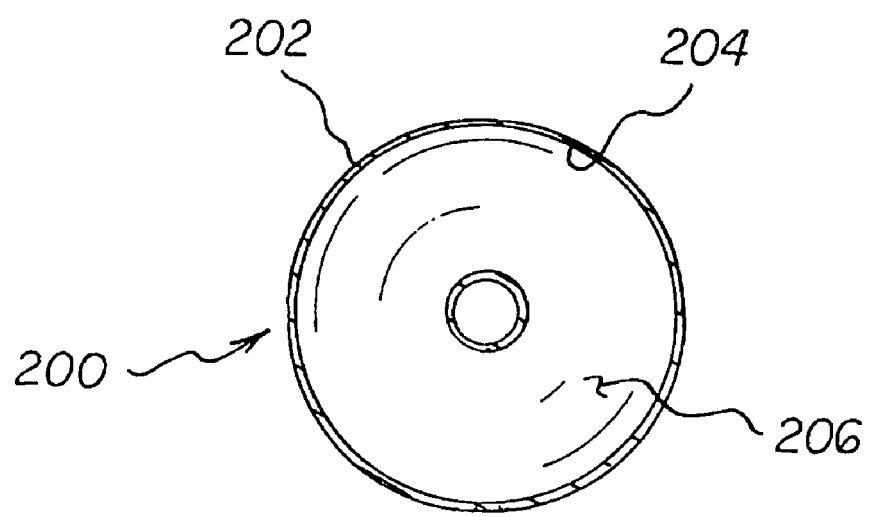
FIG 6

FIG 7
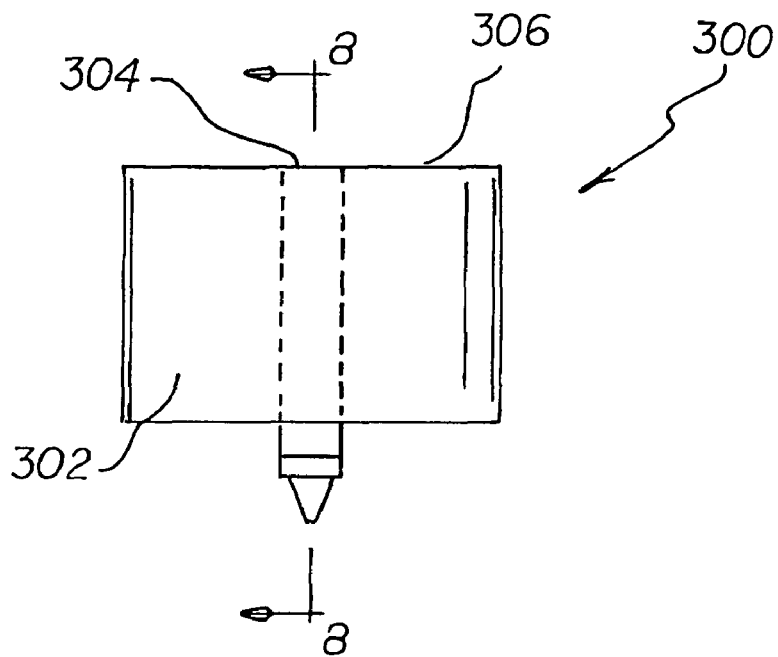
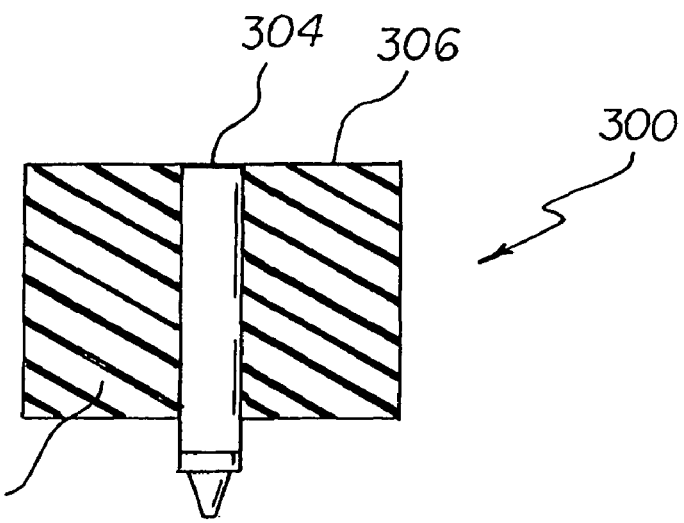
FIG 8

INFANT/CHILD CRAYON GRIP SYSTEM

RELATED APPLICATION

The present application is based upon Provisional Patent Application No. 60/859,999 filed Nov. 20, 2006, the subject matter of which is incorporated herein by reference.

BACKGROUND OF THE INVENTION

1. Field of the Invention

The present invention relates to an infant/child crayon grip system and more particularly pertains to helping infants and children develop appropriate pre-writing and handwriting skills to make crayon use easier.

2. Summary of the Invention

In view of the foregoing disadvantages inherent in the known types of grip systems of known designs and configurations now present in the prior art, the present invention provides an improved infant/child crayon grip system. As such, the general purpose of the present invention, which will be described subsequently in greater detail, is to provide a new and improved infant/child crayon grip system and method which has all the advantages of the prior art and none of the disadvantages.

To attain this, the present invention essentially comprises an infant/child crayon grip system. First provided is a crayon. The crayon has a cylindrical configuration over the majority of its extent. The crayon has a cone-shaped writing end. The crayon has a flat rear end. The crayon has a cylindrical side wall. The side wall is provided between the writing end and the rear end. The crayon has a length. The length is about 2.75 inches. The crayon is fabricated of a waxy writing material.

A covering is provided next. The covering has a cylindrical configuration over its entire extent and encompassing the majority of the extent of the side wall of the crayon. The covering has a leading end. The leading end is positioned adjacent to the conical writing end of the crayon. The writing end is exposed for use with writing. The covering has a trailing end. The trailing end is positioned adjacent to the flat rear end of the crayon. The covering has an axial length. The axial length is about 2.25 inches. The covering is fabricated of paper.

Provided last is a tubular gripping member. The tubular gripping member has a cylindrical exterior surface. The tubular gripping member has a diameter. The diameter is about 2.00 inches. The tubular gripping member has bore. The tubular gripping member has a cylindrical interior surface. The interior surface has a diameter of about 0.25 inches. The diameter of the exterior surface is about 8 times the diameter of the interior surface. The interior surface and the exterior surface have a common axis. The gripping member has a planar leading face. The planar leading face is provided perpendicular to the axes of the gripping member. The gripping member has a planar trailing face. The planar trailing face is provided parallel with the leading face. The crayon and covering are frictionally received by and supported within the interior surface of the gripping member. The trailing end of the crayon is spaced from the trailing face of the gripping member by a first distance. The leading end of the crayon is spaced from the leading face of the gripping member by a second distance. The first distance is about four times the length of the second distance.

The gripping member is a resilient memory foam. The resilient memory foam is fabricated of a visco-elastic polyurethane foam. The visco-elastic polyurethane foam has an indentation force deflection rating of between 10 and 12. In this manner when the gripping member of the system is held by children and infants for writing, the exterior surface of the gripping member will be indented and remain indented for a period of time. Further in this manner subsequent holding and writing may be facilitated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved infant/child crayon grip system which has all of the advantages of the prior art grip systems of known designs and configurations and none of the disadvantages.

It is another object of the present invention to provide a new and improved infant/child crayon grip system which may be easily and efficiently manufactured and marketed.

It is further object of the present invention to provide a new and improved infant/child crayon grip system which is of durable and reliable constructions.

An even further object of the present invention is to provide a new and improved infant/child crayon grip system which is susceptible of a low cost of manufacture with regard to both materials and labor, and which accordingly is then susceptible of low prices of sale to the consuming public, thereby making such infant/child crayon grip system economically available to the buying public.

Even still another object of the present invention is to provide an infant/child crayon grip system for helping infants and children develop appropriate pre-writing and handwriting skills to make crayon use easier.

Lastly, it is an object of the present invention to provide a new and improved infant/child crayon grip system. A writing implement has a cylindrical configuration over the majority of its extent. The writing implement has a leading and trailing end and a side wall. A generally tubular gripping member has an essentially cylindrical exterior surface and a bore forming a cylindrical interior surface. The gripping member has a leading and a trailing face. The writing implement is frictionally received by and supported within the interior surface of the gripping member. The leading end of the writing implement is spaced from the leading face of the gripping member. The gripping member is fabricated of a resilient material.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of an infant/child crayon grip system constructed in accordance with the principles of the present invention.

FIG. 2 is an enlarged side elevational view of the infant/child crayon grip system illustrated in FIG. 1.

FIG. 5 is a front elevational view of a gripping member illustrating another alternate embodiment of the invention.

FIG. 6 is a cross sectional view of the system taken along line 6-6 of FIG. 5.

FIG. 7 is a front elevational view of a system illustrating a final alternate embodiment of the invention.

FIG. 8 is a cross sectional view of the system taken along line 8-8 of FIG. 7.

The same reference numerals refer to the same parts throughout the various Figures.

DESCRIPTION OF THE PREFERRED EMBODIMENT

Figure 3:
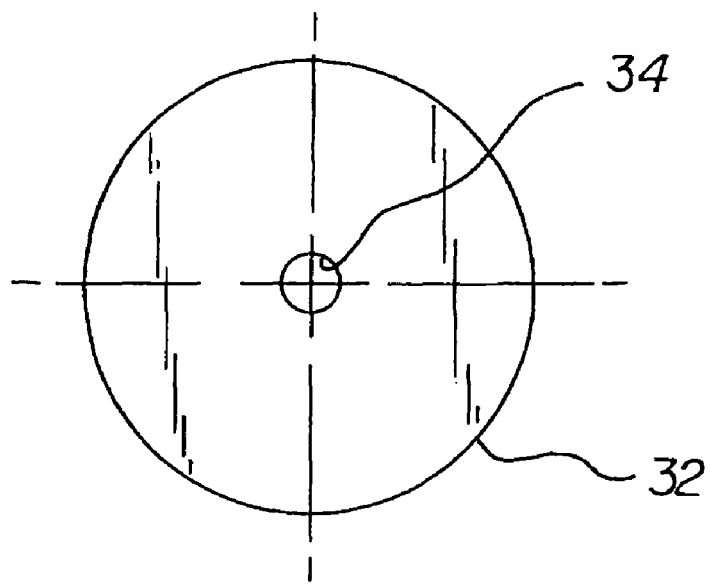
FIG. 3 is a front elevational view of the system taken along line 3-3 of FIG. 2.

With reference now to the drawings, and in particular to FIG. 1 thereof, the preferred embodiment of the new and improved infant/child crayon grip system embodying the principles and concepts of the present invention and generally designated by the reference numeral 10 will be described.

The present invention, the infant/child crayon grip system 10 is comprised of a plurality of components. Such components in their broadest context include a writing implement and a generally tubular gripping member. Such components are individually configured and correlated with respect to each other so as to attain the desired objective.

First provided is a crayon 14. The crayon has a cylindrical configuration over the majority of its extent. The crayon has a cone-shaped writing end 16. The crayon has a flat rear end 18. The crayon has a cylindrical side wall. The side wall is provided between the writing end and the rear end. The crayon has a length. The length is about 2.75 inches. The crayon is fabricated of a waxy writing material.

A covering 22 is provided next. The covering has a cylindrical configuration over its entire extent and encompassing the majority of the extent of the side wall of the crayon. The covering has a leading end 24. The leading end is positioned adjacent to the conical writing end of the crayon. The writing end is exposed for use with writing. The covering has a trailing end 26. The trailing end is positioned adjacent to the flat rear end of the crayon. The covering has an axial length. The axial length is about 2.25 inches. The covering is fabricated of paper.

Provided last is a tubular gripping member 30. The tubular gripping member has a cylindrical exterior surface 32. The tubular gripping member has a diameter. The diameter is about 2.00 inches. The tubular gripping member has bore. The tubular gripping member has a cylindrical interior surface 34. The interior surface has a diameter of about 0.25 inches. The diameter of the exterior surface is about 8 times the diameter of the interior surface. The interior surface and the exterior surface have a common axis. The gripping member has a planar leading face 36. The planar leading face is provided perpendicular to the axes of the gripping member. The gripping member has a planar trailing face 38. The planar trailing face is provided parallel with the leading face. The crayon and covering are frictionally received by and supported within the interior surface of the gripping member. The trailing end of the crayon is spaced from the trailing face of the gripping member by a first distance. The leading end of the crayon is spaced from the leading face of the gripping member by a second distance. The first distance is about four times the length of the second distance.

The gripping member is a resilient memory foam. The resilient memory foam is fabricated of a visco-elastic polyurethane foam. The visco-elastic polyurethane foam has an indentation force deflection rating of between 10 and 12. In this manner when the gripping member of the system is held by children and infants for writing, the exterior surface of the gripping member will be indented and remain indented for a period of time. Further in this manner subsequent holding and writing may be facilitated.

Figure 4:
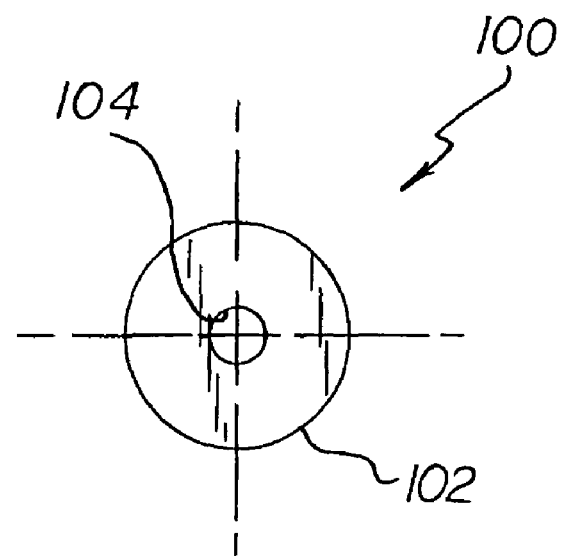
FIG. 4 is a front elevational view similar to FIG. 3 but illustrating an alternate embodiment of the invention adapted for use by smaller hands.

Reference is now made to the embodiment 100 of FIG. 4. The writing implement is a crayon. The crayon has a covering of paper. The crayon has an exterior surface 102. The exterior surface has a diameter of about 1.00 inches. In this manner the crayon may be used by smaller hands. The crayon has an interior surface 104. The interior surface has a diameter of about 0.25 inches. The diameter of the exterior surface is about 4 times the diameter of the interior surface.

From a generic point of view, the diameter of the exterior surface is between 4 and 8 times the diameter of the interior surface.

Reference is now made to the embodiment 200 of FIGS. 5 and 6. A gripping member 202 is provided. The gripping member is a pneumatic member. The gripping member is fabricated of a resilient air impervious plastic 204. The gripping member is in a torus-shaped configuration. The gripping member has a hollow chamber 206. The hollow chamber is filled with air.

Reference is now made to the embodiment of FIGS. 7 and 8. A gripping member is provided. The gripping member is a resilient silicone rubber member 302.

In the final alternate embodiment 300, the writing implement has a rear end 304. The gripping member has a rear face 306. The rear end of the writing implement is located adjacent to the rear face of the gripping member.

This invention thus relates to a gripping aid of a writing utensil by an individual. The gripping aid was created to help the infant and/or child develop appropriate pre-writing and handwriting skills to make crayon use easier.

The gripping aid teaches an infant and/or child to use an immature tripod grasp. The immature tripod grasp is preferred at this age as it mimics the mature grasp used by an adult. As the infant/child's ability to use the precision muscles of the hands develops from using the crayon grip, the immature tripod grasp becomes more refined into the mature dynamic tripod grasp. Note FIG. 1.

Second, the gripping aid is available in two sizes. The larger size (FIG. 2) is designed for an infant and/or child's beginning crayon experiences. This size passes the choking tube test while still placing the hand in an immature tripod grasp. The second size is designed for children with more crayon experience. This size is smaller in width and moves the child's hand closer to the mature tripod grasp. Note FIG. 4. The crayon grips can be used in stages and will assist the child in effortlessly transitioning to mature tripod grasp.

The gripping aid has a malleable surface, memory foam or pneumatic or rubber silicone, which provides feedback to the brain as to where the fingers and thumb are in space. The tactile material allows the infant/child's hand to slightly imprint on the material. The tactile input reinforces an immature tripod grasp throughout the entire pre-writing or writing activity. The material can sustain the force and pressure greater than that which can be exerted from an infant or child.

The gripping aid uses a writing utensil, crayon/pencil/pen/marker or paint brush, that is placed into the radius of the center hole. The writing utensil can also be cut so it is flush with the gripping aid, to reinforce the immature tripod grasp. The malleable surface surrounds the gripping aid, making it larger in size and more appropriate for the child's hand and ultimately improving grasp and eye-hand coordination skills.

The gripping aid can help a child get the "right start" with writing and handwriting tasks and makes learning to hold and use crayons easier and more fun for the child, thus promoting success in early writing development.

The gripping aid was created to help individuals with decreased range of motion in the digits of the hand grasp a writing utensil. The gripping aid increases the diameter of the writing utensil and makes grasping easier.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A grip system comprising:
    a writing implement having a length in a cylindrical configuration with a first diameter over the majority of its extent with a leading and trailing end and with a side wall, the writing implement adapted to be used by people with greater motor skills; and
    a generally tubular gripping member having an essentially cylindrical exterior surface with a second diameter greater than the first diameter, a bore through the gripping member forming a cylindrical interior surface with a third diameter when the gripping member is received by the writing implement, the gripping member having a side wall between the cylindrical exterior surface and the bore, the side wall of the gripping member having a thickness greater than the diameter of the writing implement, the gripping member having a leading and a trailing face, the writing implement being frictionally received by and supported within the interior surface of the gripping member with the leading end of the writing implement being spaced from the leading face of the gripping member, the gripping member covering the majority of the length of the writing implement when in system configuration adapted to be used by young children and people with undeveloped motor skills, the gripping member being fabricated of a resilient foam material.

2. The system as set forth in claim 1 wherein the writing implement is a crayon with a covering of paper and the exterior surface has a diameter of about 2.00 inches and the interior surface has a diameter of about 0.25 inches, the diameter of the exterior surface being about 8 times the diameter of the interior surface of the writing implement.

3. The system as set forth in claim 1 wherein the gripping member is a resilient memory foam fabricated of a visco-elastic polyurethane foam with an indentation force deflection rating of between 10 and 12.

4. The system as set forth in claim 1 wherein the writing implement is a crayon with a covering of paper and the exterior surface has a diameter of about 1.00 inches for smaller hands and the interior surface has a diameter of about 0.25 inches, the diameter of the exterior surface of the gripping member being about 4 times the diameter of the interior surface of the writing implement.

5. The system as set forth in claim 1 wherein the gripping member is a pneumatic member, fabricated of a resilient air impervious plastic in a torus-shaped configuration with a hollow chamber filled with air.

6. The system as set forth in claim 1 wherein the gripping member is a resilient silicone rubber member.

7. The system as set forth in claim 1 wherein the rear end of the writing implement is located adjacent to the rear face of the gripping member.

8. The system as set forth in claim 1 wherein the gripping member is fabricated of a resilient material selected from the class of resilient materials including a memory foam material, a pneumatic material and a resilient silicone rubber material.

9. The system as set forth in claim 1 wherein the diameter of the exterior surface is between about 4 and 8 times the diameter of the interior surface.

10. An infant/child crayon grip system for helping young children and people with undeveloped motor skills develop appropriate pre-writing and handwriting skills to make crayon use easier comprising, in combination:
    a crayon having a length in a cylindrical configuration over the majority of its extent, the crayon being formed with a cone-shaped writing end and a flat rear end with a cylindrical side wall between the writing end and the rear end, the crayon having a length of about 2.75 inches, the crayon being fabricated of a waxy writing material;
    a covering having a cylindrical configuration over its entire extent and encompassing the majority of the extent of the side wall of the crayon, the covering being formed with a leading end positioned adjacent to the conical writing end of the crayon but exposing the writing end for use for writing, the covering being formed with a trailing end positioned adjacent to the flat rear end of the crayon, the covering having an axial length of about 2.25 inches, the covering being fabricated of paper; and
    a tubular gripping member having a cylindrical exterior surface with a diameter of about 2.00 inches and a bore forming a cylindrical interior surface with a diameter of about 0.25 inches, the diameter of the exterior surface being about 8 times the diameter of the interior surface, the gripping member having a side wall between the exterior surface and the interior surface, the side wall of the gripping member having a thickness greater than the diameter of the crayon, the interior surface and the exterior surface having a common axis, the gripping member having a planar leading face perpendicular to the axes of the gripping member and a planar trailing face parallel with the leading face, the gripping member covering the majority of the length of the crayon, the first distance being about four times the length of the second distance, the gripping member being a resilient memory foam fabricated of a visco-elastic polyurethane foam with an indentation force deflection rating of between 10 and 12 whereby when the gripping member of the system is held by children and infants for writing, the exterior surface of the gripping member will be indented and remain indented for a period of time so that subsequent holding and writing may be facilitated.

11. A teaching system for young children and people with undeveloped motor skills, the system comprising:

a crayon having a length in cylindrical configuration with a first diameter over the majority of its extent with a leading and trailing end and with a side wall, the crayon adapted to be used by people with developed motor skills; and a generally tubular gripping member having an essentially cylindrical exterior surface with a second diameter greater than the first diameter, a bore through the gripping member forming a cylindrical interior surface with a third diameter when in system configuration, the gripping member having a side wall between the cylindrical exterior surface and the bore, the side wall of the gripping member having a thickness greater than the diameter of the crayon, the crayon being frictionally received by and supported within the interior surface of the gripping member, the gripping member covering the majority of the length of the crayon and adapted to be used by young children and people with undeveloped motor skills, the gripping member being fabricated of a resilient foam material.

* * * * *